United States Patent
Bender et al.

[19]

[11] Patent Number: 6,116,839
[45] Date of Patent: Sep. 12, 2000

[54] SLOPE EXTENSION FOR VEHICLE RESTRAINTS

[75] Inventors: Brian Bender, Racine; Norbert Hahn, Franklin; John A. Schiessl, Mukwonago, all of Wis.

[73] Assignee: Rite-Hite Holding Corporation, Milwaukee, Wis.

[21] Appl. No.: 09/085,810

[22] Filed: May 27, 1998

[51] Int. Cl.$^7$ .................................................. B65G 69/22
[52] U.S. Cl. ............................ 414/401; 414/396; 414/584
[58] Field of Search .................................. 414/396, 584, 414/401, 537, 538; 14/69.5, 71.1, 71.3, 71.8; 254/88; 193/14, 38

[56] References Cited

U.S. PATENT DOCUMENTS

| | | | |
|---|---|---|---|
| Re. 32,968 | 6/1989 | Hahn ........................................ | 414/401 |
| 2,643,010 | 6/1953 | Hott et al. ................................ | 414/584 |
| 4,208,161 | 6/1980 | Hipp et al. ............................... | 414/401 |
| 4,264,259 | 4/1981 | Hipp ......................................... | 414/401 |
| 4,282,621 | 8/1981 | Anthony .................................... | 14/71.1 |
| 4,373,847 | 2/1983 | Hipp et al. ............................... | 414/401 |
| 4,379,354 | 4/1983 | Hahn et al. ............................... | 14/71.3 |
| 4,443,150 | 4/1984 | Hahn et al. ............................... | 414/401 |
| 4,472,099 | 9/1984 | Hahn et al. ............................... | 414/401 |
| 4,560,315 | 12/1985 | Hahn ....................................... | 414/401 |
| 4,695,216 | 9/1987 | Erlandsson ............................... | 414/401 |
| 5,870,788 | 2/1999 | Witkin ..................................... | 414/921 X |

OTHER PUBLICATIONS

Four (4) photographs of slope extension installed on vehicle restraints in St. Louis, Missouri in 1990.

Blueprints No. 11328, Sheet Nos. 18–19 showing slope extension which was installed with a vehicle restraint in approximately Sep. of 1997.

Blueprints No. 11089, Sheet Nos. 1, 2, 2B, 3, 3A, 4 and 5 showing a slope extension which was installed with a vehicle restraint in approximately Jul. of 1996.

*Primary Examiner*—Frank E. Werner
*Attorney, Agent, or Firm*—Marshall, O'Toole, Gerstein, Murray & Borun

[57] ABSTRACT

Two embodiments of a slope extension are disclosed herein for use with a vehicle restraint. In each embodiment, the vehicle restraint is adapted to releasably secure a parked trailer or other vehicle to an adjacent structure, such as a loading dock, and includes a carriage assembly which is adjustably mounted in proximity to the adjacent structure for movement relative to a roadway, and a restraining member which is operatively attached to the carriage assembly. In operation, each embodiment of the inventive slope extension interacts with the carriage assembly to avoid a "dead lock" condition wherein the carriage assembly is obstructed from moving downwardly toward the roadway.

15 Claims, 10 Drawing Sheets

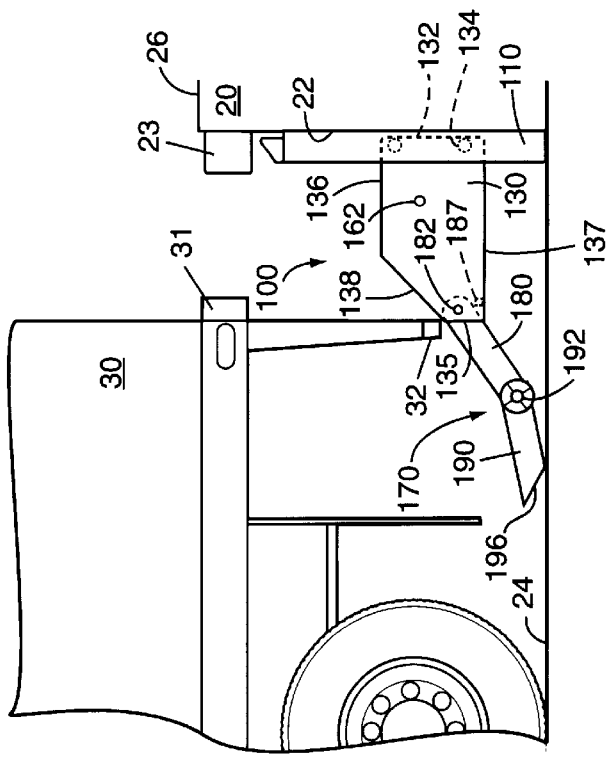
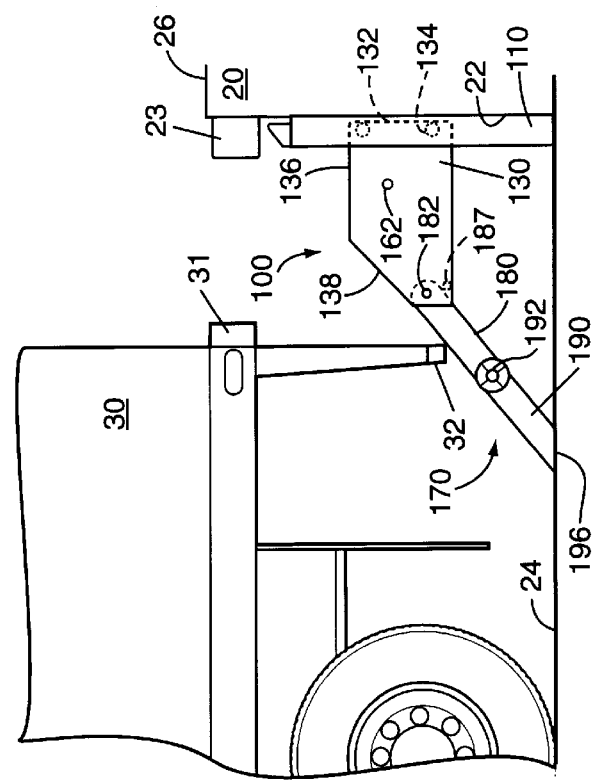
FIG. 6
FIG. 5

SLOPE EXTENSION FOR VEHICLE RESTRAINTS

FIELD OF THE INVENTION

The present invention relates generally to vehicle restraints and, more particularly, to an improved slope extension for a vehicle restraint that permits a wide range of vehicles to be secured to an adjacent structure, such as a loading dock or the like.

BACKGROUND OF THE INVENTION

The proper securing of a parked vehicle, such as the trailer of a tractor-trailer, to a loading dock during loading and unloading operations is an essential safety precaution. Various vehicle restraints have previously been provided for this purpose, as disclosed, for example, in U.S. Pat. No. 4,208,161 (Hipp et al.), U.S. Pat. No. 4,264,259 (Hipp), U.S. Pat. No. 4,282,621 (Anthony), U.S. Pat. No. 4,373,847 (Hipp et al.), U.S. Pat. No. 4,379,354 (Hahn et al.), U.S. Pat. No. 4,443,150 (Hahn et al.), U.S. Pat. No. 4,472,099 (Hahn et al.), U.S. Pat. No. 4,560,315 (Hahn), and U.S. Pat. No. Re. 32,968 (Hahn).

One common type of vehicle restraint 40 is shown in FIGS. 1 and 2 of the drawings. This particular type of vehicle restraint 40 includes a carriage assembly 50 which is adjustably mounted within a track 60 for substantially vertical movement adjacent to a front wall 22 of a loading dock 20, a generally hook-shaped restraining member 70 which is housed within and pivotably attached to the carriage assembly 50, and a slope extension 80 which is pivotably mounted to the forward end of the carriage assembly 50 at pivot point 52. As is customary in the art, the carriage assembly 50 is biased by one or more resilient biasing elements (not shown) to assume an upper vertical position, as shown, for example, in FIG. 1, but may be moved downwardly into a lower vertical position, as shown, for example, in FIG. 2, when an external force is exerted on the vehicle restraint 40. By way of illustration, when the trailer 30 of a tractor-trailer moves backwardly towards the loading dock 20, engagement between an ICC bar or rear-impact guard 32 of the trailer 30 and either the slope extension 80 or an exposed cam surface 54 of the carriage assembly 50 causes an external force to be exerted on the vehicle restraint 40 which tends to move the carriage assembly 50 downwardly toward a vehicle supporting surface, such as roadway 24. The purpose of this upward biasing of the carriage assembly 50, and its downward positioning by the ICC bar 32, is to ensure that a proper orientation is obtained between the restraining member 70 and the ICC bar 32 before the restraining member 70 is moved into an engaging position, as shown in FIG. 2.

In order to avoid interference between the slope extension 80 and the roadway 24 as the carriage assembly 50 is being lowered, the slope extension 80 is pivotably mounted to the forward end of the carriage assembly 50 in a manner which permits the slope extension 80 to rotate upwardly out of the way. To this end, a stop member 56 is provided beneath the top portion of the slope extension 80 to permit the slope extension 80 to rotate about pivot point 52 in a clockwise direction, as indicated by reference numeral 82 in FIG. 1, but not in a counter-clockwise direction. More specifically, the stop member 56 allows the slope extension 80 to rotate from a normal pendent position wherein the slope extension 80 forms an extension of the exposed cam surface 54 of the carriage assembly 50, as shown in FIG. 1, to a raised position wherein the slope extension 80 and the exposed cam surface 54 form an angle of less than 180°.

While vehicle restraint 40 performs in a generally reliable manner, its carriage assembly 50, in some instances, may be obstructed from moving downwardly toward the roadway 24. In such instances, the carriage assembly 50 suffers from what is known in the art as a "dead lock" condition. One example of a "dead lock" condition occurs when the ICC bar 32 of a given trailer 30 is lower in elevation than pivot point 52 after the slope extension 80 contacts the roadway 24, as shown, for example, in FIG. 2. When this happens, the ICC bar 32 of the trailer 30 obstructs clockwise rotational movement of the slope extension 80, as viewed in FIG. 2. At the same time, engagement between the slope extension 80 and the roadway 24 obstructs further downward movement of the carriage assembly 50. As a result, the trailer 30 is obstructed from backing further toward the front wall 22 of the loading dock 20, thus inhibiting the intended securement of the trailer 30 to the loading dock 20.

OBJECTS OF THE INVENTION

Accordingly, a general object of the present invention is to provide a vehicle restraint which overcomes the above-identified deficiencies of the prior art.

A more specific object of the present invention is to provide a carriage assembly for a vehicle restraint which is not susceptible to a "dead lock" condition.

A further object of the present invention is to provide a slope extension for a vehicle restraint which permits different sizes and configurations of vehicles to be secured to an adjacent structure, such as a loading dock or the like.

A related object of the present invention is to provide a slope extension for a vehicle restraint which permits a wider range of vehicles to be secured to a loading dock than the prior art.

Another object of the present invention is to provide a slope extension for a carriage assembly which prevents any portion of a vehicle from going underneath the carriage assembly as the vehicle moves towards the carriage assembly.

An additional object of the present invention is to provide a slope extension as characterized above which is relatively easy to install and maintain, and which lends itself to reliable operation and use.

A supplementary object of the present invention is to provide a slope extension of the foregoing type which is reliable, durable, and convenient to use.

SUMMARY OF THE INVENTION

Two embodiments of an inventive slope extension are disclosed herein for use with a vehicle restraint. In each embodiment, the vehicle restraint is adapted to releasably secure a parked trailer or other vehicle to an adjacent structure, such as a loading dock, and includes a carriage assembly which is adjustably mounted in proximity to the adjacent structure for movement relative to a roadway, and a restraining member which is operatively attached to the carriage assembly. In operation, each embodiment of the inventive slope extension interacts with the carriage assembly to avoid a "dead lock" condition wherein the carriage assembly is obstructed from moving downwardly toward the roadway.

In the first embodiment, the slope extension comprises a first member which is pivotably attached to the carriage assembly and a second member which is pivotably attached to the first member. When the carriage assembly is moved downwardly below a predetermined operating position relative to the roadway, the second member pivots independently of the first member to permit continued downward descent of the carriage assembly. In particular, the second member includes a distal end which is adapted to engage the roadway as the carriage assembly is moved downwardly past the predetermined operating position, while the first and second members pivot independently upwardly relative to each other and the carriage assembly to avoid a "dead lock" condition and to permit continued downward descent of the carriage assembly.

In the second embodiment, the slope extension comprises a structural member having a first end pivotably attached to the roadway, a second end opposite the first end, and at least one cam surface disposed between the first and second ends which slidably engage at least one protuberance formed on the carriage assembly. When an external force is exerted on the structural member by a moving vehicle or the like, the cam surface(s) of the structural member act against the protuberance(s) of the carriage assembly and cause the carriage assembly to move from an upper operating position toward successively lower operating positions, without subjecting the carriage assembly to a "dead lock" condition.

These and other objects, features, and advantages of the present invention will become more readily apparent upon reading the following detailed description of preferred exemplified embodiments and upon reference to the accompanying drawings wherein:

BRIEF DESCRIPTION OF THE DRAWINGS

FIGS. 4–7 are side elevational views of the vehicle restraint depicted in FIG. 3, showing an ICC bar of a trailer sequentially engaging the slope extension and a carriage assembly of the vehicle restraint as the trailer moves backwardly toward a loading dock;

Figure 1:
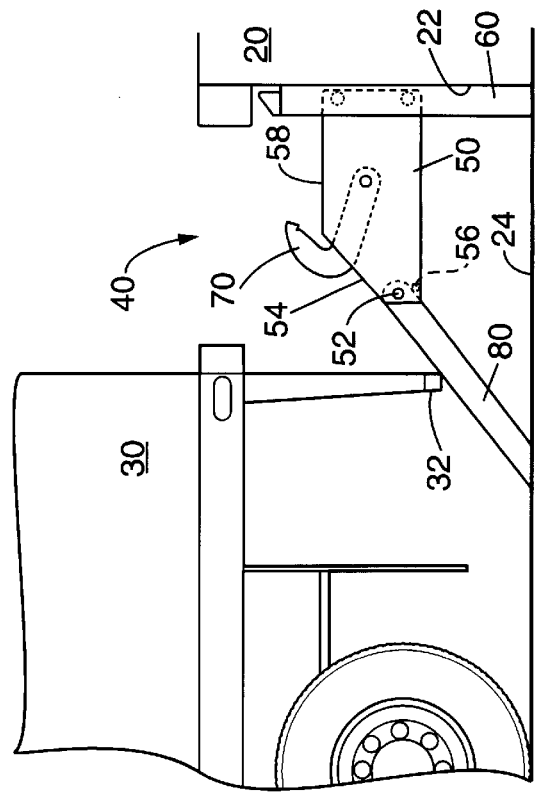
FIG. 1 is a side elevational view of a previously described prior art vehicle restraint.

While the invention is susceptible to various modifications and alternative constructions, certain illustrated embodiments thereof have been shown in the drawings and will be described in detail below. It should be understood, however, that there is no intention to limit the present invention to the disclosed structural forms. On the contrary, the intention is to cover all modifications, alternative constructions, and equivalents that fall within the spirit and scope of the invention as defined by the appended claims.

DETAILED DESCRIPTION OF THE PREFERRED EMBODIMENTS

Turning now to the drawings and, more particularly, to FIGS. 3–9, a vehicle restraint 100 constructed in accordance with the present invention is provided for releasably securing a parked trailer 30 of a tractor-trailer or other vehicle to an adjacent structure, such as a loading dock 20. As is customary in the art, the loading dock 20 includes a generally vertical front wall 22, a roadway 24 which allows the trailer 30 to be positioned near the loading dock 20, and an elevated platform surface 26. In addition, one or more protective bumpers 23 may be attached to the front wall 22 of the loading dock 20 to protect it from impact by a rear portion 31 of the trailer 30.

Figure 8:
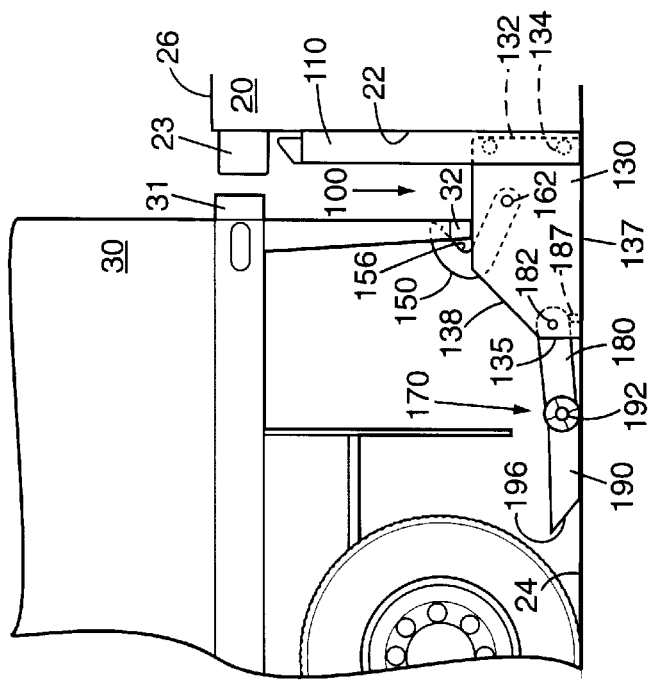
FIG. 8 is a side elevational view of the vehicle restraint depicted in FIGS. 3–7, showing a restraining member of the vehicle restraint interlockingly engaging the ICC bar to secure the trailer to the loading dock.
Figure 9:
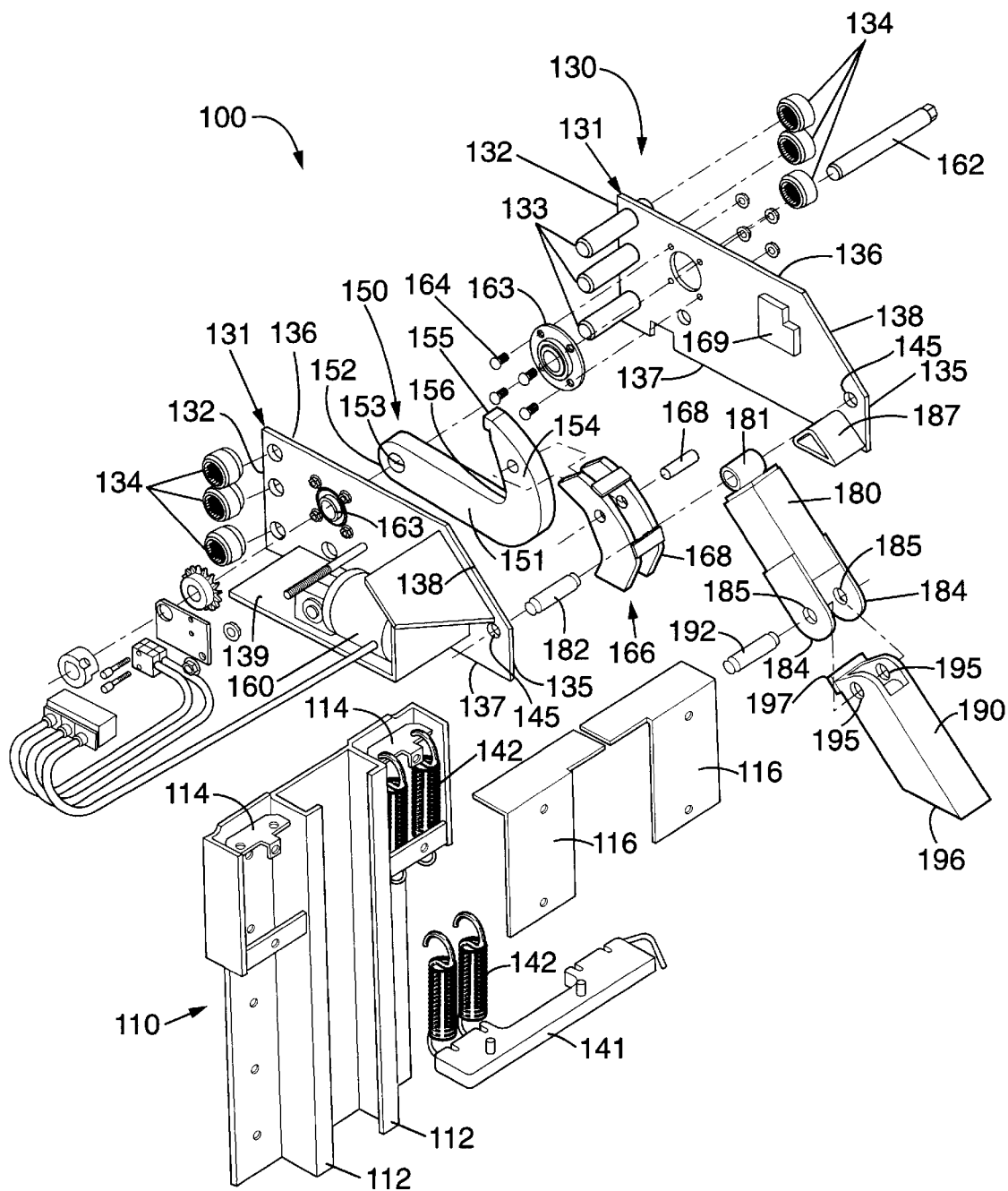
FIG. 9 is an enlarged perspective view of the vehicle restraint depicted in FIGS. 3–8, showing the components of the vehicle restraint and of the slope extension in greater detail.

Like the bumpers 23, the vehicle restraint 100 of the present invention is also attached to the front wall 22 of the loading dock 20. More specifically, the vehicle restraint 100 includes a mounting structure 110 which is fixedly attached to the front wall 22 of the loading dock 20, a carriage assembly 130 which is adjustably mounted on the mounting structure 110 for substantially vertical movement with respect to both the mounting structure 110 and the front wall 22 of the loading dock 20, and a restraining member 150 which is housed within the carriage assembly 130 and is operatively attached thereto. In the illustrated embodiment, for example, the restraining member 150 has a substantially hook-shaped configuration, as shown in FIGS. 8 and 9, and is pivotably attached to the carriage assembly 130 at point 162. Notwithstanding this characterization, those skilled in the art will readily appreciated that other restraining member 150 configurations and attachments to the carriage assembly 130 may alternatively be employed without departing from the scope or spirit of the present invention.

In keeping with an important aspect of the present invention, the vehicle restraint 100 includes an inventive slope extension, two embodiments of which are disclosed herein. Specifically, a first embodiment of the slope extension 170 is shown in FIGS. 3–9, and a second embodiment of the slope extension 270 is shown in FIGS. 10–17. With either embodiment of the slope extension 170 and 270, the vehicle restraint 100 is able to accommodate a wider range of vehicles 30 than the prior art vehicle restraint 40 shown in FIGS. 1 and 2, including trailers 30 with low ICC bars 32.

Figure 15:
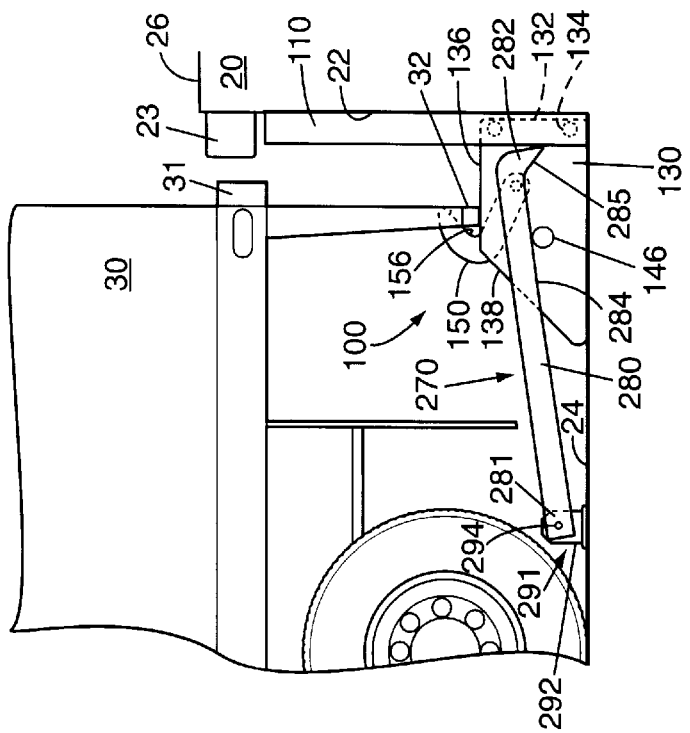
FIG. 15 is a side elevational view of the vehicle restraint depicted in FIGS. 10–14, showing a restraining member of the vehicle restraint interlockingly engaging the ICC bar to secure the trailer to the loading dock.

In use, the vehicle restraint 100 advantageously secures the trailer 30 to the loading dock 20 by interlockingly engaging or hooking a transversely extending ICC (Interstate Commerce Commission) bar or rear-impact guard 32 of the trailer 30, as shown, for example, in FIGS. 8 and 15. When the ICC bar 32 is secured in such a manner, the trailer 30 is reliably restrained from accidentally or inadvertently moving away from the loading dock 20 during the loading or unloading of cargo.

Figure 16:
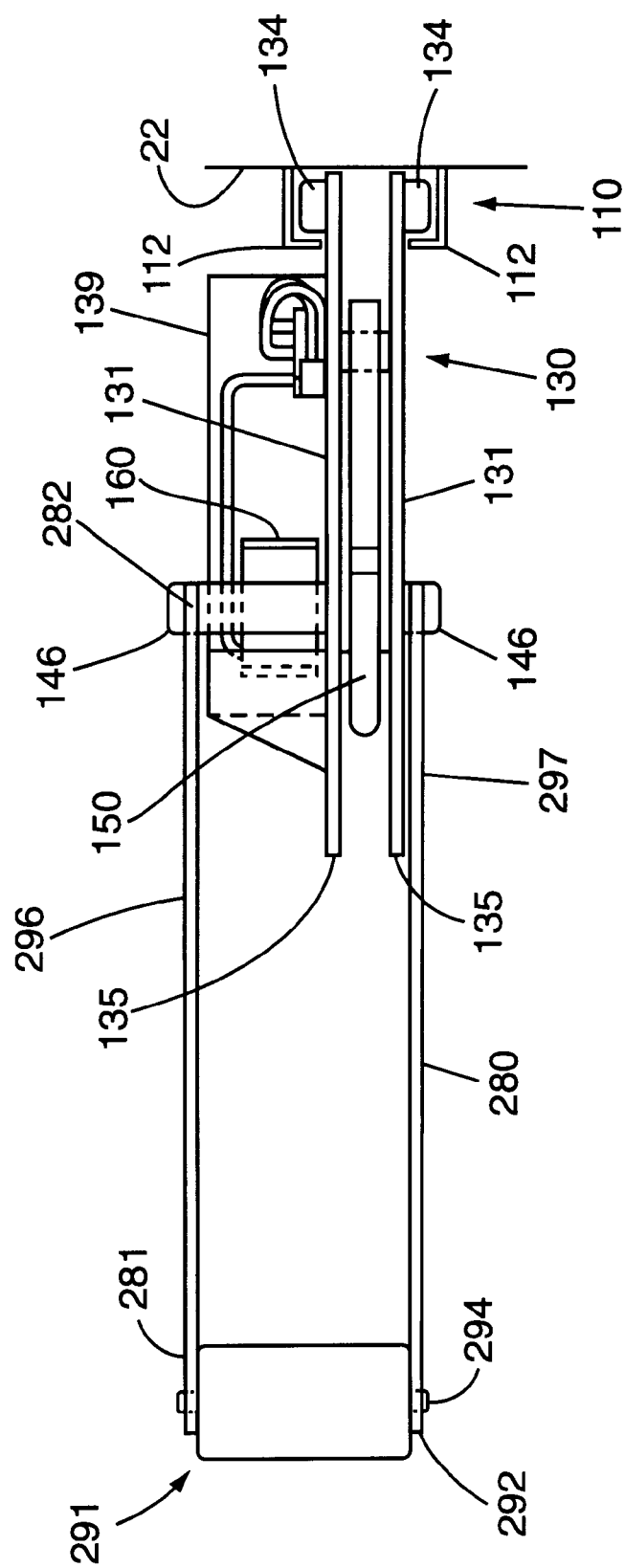
FIG. 16 is a top plan view of the vehicle restraint depicted in FIGS. 10–15, showing the components of the vehicle restraint and of the slope extension in greater detail.
Figure 17:
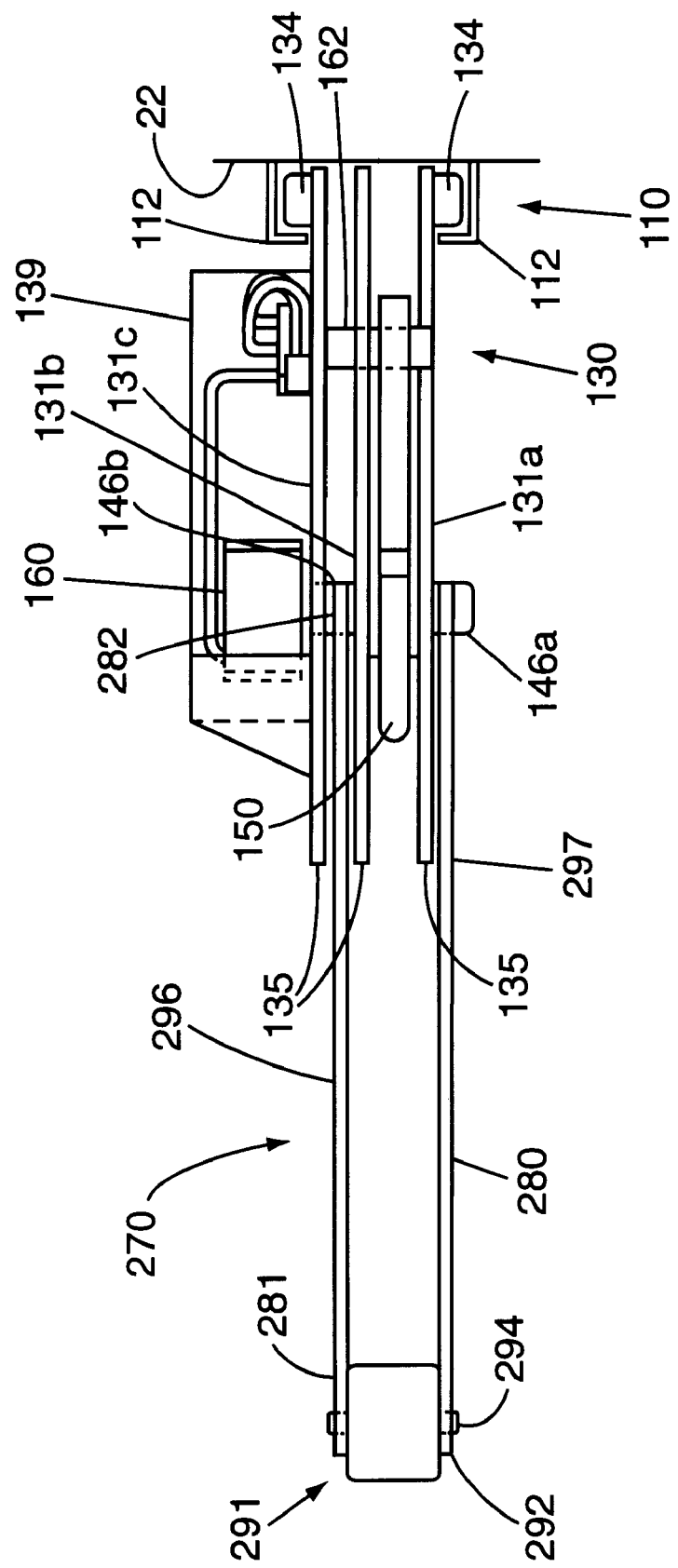
FIG. 17 is a perspective view of the vehicle restraint depicted in FIGS. 10–16, showing an alternative construction of carriage assembly.

As best shown in FIGS. 9, 16, and 17, the mounting structure 110 of the vehicle restraint 100 includes a pair of opposed and vertically arranged guide tracks 112 which are fixedly attached to the front wall 22 of the loading dock 20 with fasteners (not shown) such as bolts or the like. As will be discussed in greater detail below, these guide tracks 112 are specifically adapted to receive and guide the carriage assembly 130 as it moves between successive operating positions.

In the illustrated embodiment, the carriage assembly 130 includes a frame which is formed by a pair of similarly-shaped, spaced-apart side plates 131 and a bottom strut member 141 which supports and carries the side plates 131, as shown, for example, in FIG. 9. Each side plate 131 includes an aft end 132, a forward end 135, an upper surface 136, a lower surface 137, and an exposed cam surface 138 which slopes downwardly from the upper surface 136 to the forward end 135. One of the side plates 131 may also be provided with a ledge structure 139 which supports a reversible motor 160 for the restraining member 150.

In order to permit the carriage assembly 130 to move in a substantially vertical manner relative to the roadway 24, the aft end 132 of the side plates 131 include a plurality of aligned shafts 133 and associated rollers 134 which are contained within and engage the guide tracks 112 of the mounting structure 110. A plurality of biasing elements, such as springs 142 or the like, are also provided for biasing the carriage assembly 130 upwardly within the guide tracks 112 toward an upper operating position, as shown, for example, in FIGS. 3 and 10. In the illustrated embodiment, the springs 142 extend between the bottom strut member 141 of the carriage assembly 130 and a pair of flanges 114 which project outwardly from the top portion of the mounting structure 110, as shown in FIG. 9. Both the springs 142 and the top portion of the guide tracks 112 are preferably covered by protective housing members 116 to shield the springs 142.

When the trailer 30 moves backwardly with respect to the front wall 22 of the loading dock 20 toward a parked position, the ICC bar 32 of the trailer 30 ordinarily engages the exposed cam surfaces 138 of the side plates 131 and exerts an external force thereon which counteracts the biasing provided by the springs 142 and causes the carriage assembly 130 to move downwardly from the upper operating position toward successively lower operating positions. Once the trailer 30 arrives at the parked position, the ICC bar 32 engages the upper surfaces 136 of the side plates 131 and the restraining member 150 may be activated to interlockingly engage or hook the ICC bar 32, as shown, for example, in FIGS. 8 and 15. In this way, the trailer 30 is secured to the loading dock 20 to assist in preventing the trailer 30 from accidentally or inadvertently moving away therefrom.

As shown in FIG. 9, the restraining member 150 may include a shank portion 151 with a proximal end 152, a leg portion 154 with a distal end 155 extending at an angle with respect to the shank portion 151, and a throat portion 156 disposed between the proximal end 152 and the distal end 154. In use, the motor 160 drives the restraining member 150 between a stored position and an operative position. In the stored position, the distal end 154 of the restraining member 150 is incapable of engaging any portion of the trailer 30 because it is substantially enclosed within and concealed by the side plates 131 of the carriage assembly 130, as shown, for example, in FIGS. 3–7 and 10–14. In the operative position, conversely, the distal end 154 of the restraining member 150 projects outwardly from the side plates 131 of the carriage assembly 130, as shown, for example, in FIGS. 8 and 15, and the throat portion 156 is positioned to interlockingly engage the ICC bar 32 of the trailer 30. When the restraining member 130 interlockingly engages the ICC bar 32 in this way, movement of the trailer 30 away from the loading dock 10 causes the throat portion 156 to hook onto the ICC bar 32, thereby providing restraint against further movement of the trailer 30 away from the loading dock 20. For this reason, the stored and operative positions of the restraining member 150 are also referred to as the vehicle-release and vehicle-locking positions, respectively.

In the illustrated embodiment, the restraining member 150 is pivotably attached between the side plates 131 of the carriage assembly 130 by a transversely extending rotatable shaft 162. As best shown in FIG. 9, the shaft 162 is fixedly attached to the proximal end 152 of the restraining member 150 at hole 153, and is rotatably received by a pair of journal or sleeve bearings 163 which are fixedly mounted within complementary shaped apertures 144 formed in the side plates 131 of the carriage assembly 130 by a plurality of bolts 164 or the like. When the shaft 162 is rotated by the motor 160, the restraining member 150 rotates in conjunction with the shaft 162 between the stored and operative positions, but relative to the side plates 131 and the journal bearings 163. In order to protect the motor 160 when an external torque is exerted on the restraining member 150, the motor 160 is preferably provided with a slip clutch (not shown) which allows the shaft 162 and the attached restraining member 150 to rotate against the action of the motor 160.

As described more fully in co-pending application Ser. No. 08/842,163, the vehicle restraint 100 may also be provided with a locking or anti-rotation mechanism 166 which prevents the restraining member 150 from rotating out of the operative position and into the stored position when the ICC bar 32 of the trailer 30 improperly engages the distal end 155 of the restraining member 150 and exerts an external torque thereon. As shown in FIG. 9, the locking or anti-rotation mechanism 166 includes a first locking member 167 which is pivotably attached to the leg portion 154 of the restraining member 150 with a pin 168 or the like, and a second locking member 169 which is fixedly attached to one of the side plates 131 of the carriage assembly 130.

In keeping with an important aspect of the present invention, the vehicle restraint 100 is also provided with two embodiments of the inventive slope extension which are identified herein by reference numerals 170 and 270, respectively. As will be described in greater detail below, each embodiment of the slope extension 170 and 270 provides substantial benefits over prior art slope extensions, such as slope extension 80 of FIGS. 1 and 2. By way of example, each slope extension 170 and 270 of the present invention is capable of accommodating different sizes and configurations of vehicles 32, including trailers 32 with low ICC bars 32. In addition, the carriage assembly 130 which utilizes either of these slope extensions 170 and 270 is not susceptible to a "dead lock" condition.

Figure 3:
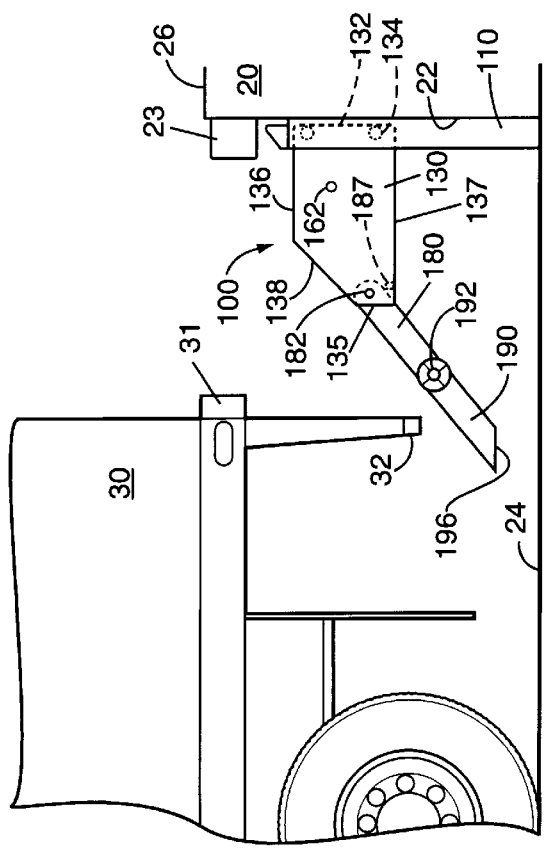
FIG. 3 is a side elevational view of a vehicle restraint having a carriage assembly and a slope extension constructed in accordance with a first embodiment of the present invention.

As shown in FIGS. 3–9, the first embodiment of the slope extension 170 comprises a first member 180 which is pivotably attached to the carriage assembly 130 and a second member 190 which is pivotably attached to the first member 180. As best shown in FIG. 9, the upper end of the first member 181 includes a sleeve 181, and the lower end of the first member 180 includes a pair of flanges 184 with aligned holes 185. During assembly, the first member 180 is pivotably attached to the forward end 135 of the carriage assembly 130 by inserting a first pin 182 through the sleeve 181 of the first member 180 and through corresponding holes 145 formed in carriage assembly 130, while the second member 190 is pivotably attached to first member 180 by positioning the upper end of the second member 190 between the flanges 184 of the first member 180 and by inserting a second pin 192 through the aligned holes 185 of the flanges 184 and through corresponding holes 195 formed in the upper end of the second member 190. The second member 190 also includes a distal end 196 which is adapted to engage the roadway 24 when an external force moves the carriage assembly 130 from the upper operating position, as shown in FIG. 3, toward successively lower operating positions.

In order to permit the first and second members 180 and 190 of the inventive slope extension 170 to independently rotate upwardly out of the way as the carriage assembly 130 is being lowered toward the roadway 24, the first member 180 is pivotably attached to the carriage assembly 130 and the second member 190 is pivotably attached to the lower end of the first member 180. In addition, a stop member 187 is positioned at the corner of the forward ends 135 and the lower surfaces 137 of the carriage assembly 130 to enable the first member 180 to assume an outwardly and downwardly extending pendent position by force of gravity, wherein the first member 180 forms a substantially straight and coplanar extension of the exposed cam surfaces 138 of the carriage assembly 130, as shown, for example, in FIGS. 3 and 4. In use, the stop member 187 prevents the first member 180 from rotating downwardly past its pendent position, but allows the first member 180 to rotate upwardly to a raised position, wherein the first member 180 and the exposed cam surfaces 138 form an angle of less than 180°, as shown, for example, in FIG. 8. Likewise, as shown in FIG. 9, a stop element 197 is positioned on the top end of the second member 190 to enable the second member 190 of the slope extension 170 to assume an outwardly and downwardly extending pendent position by force of gravity, wherein the second member 190 forms a substantially straight and coplanar extension of the first member 180, as shown, for example, in FIGS. 3 and 4. In use, the stop element 197 prevents the second member 190 from rotating downwardly past its pendent position, but allows the second member 190 to rotate upwardly to a raised position, wherein the first and second members 180 and 190 form an angle of less than 180°, as shown, for example, in FIGS. 6 and 7. Although stop element 187 is shown as forming a part of the carriage assembly 130 and the stop element 197 is shown as forming a part of the second member 190, it will be readily appreciated by those skilled in the art that stop elements 187 and 197 may alternatively be provided on the first member 180 without departing from the scope or spirit of the present invention.

Because the first and second members 180 and 190 pivot independently of each other, the first embodiment of the inventive slope extension 170 operates in an articulated manner. For example, when the carriage assembly 130 is moved downwardly below a predetermined operating position relative to the roadway 24, the first and second member 180 and 190 pivot independently upwardly from their pendent positions to permit continued downward descent of the carriage assembly 130. More specifically, as the carriage assembly 130 is moved downwardly within the guide tracks 112 of the mounting structure 110 past the predetermined operating position, the distal end 196 of the second member 190 engages the roadway 24, as shown in FIG. 5, while the first and second members 180 and 190 pivot independently upwardly relative to each other and the carriage assembly 130, as shown, for example, in FIGS. 6–8, to permit continued downward descent of the carriage assembly 130.

Figure 4:
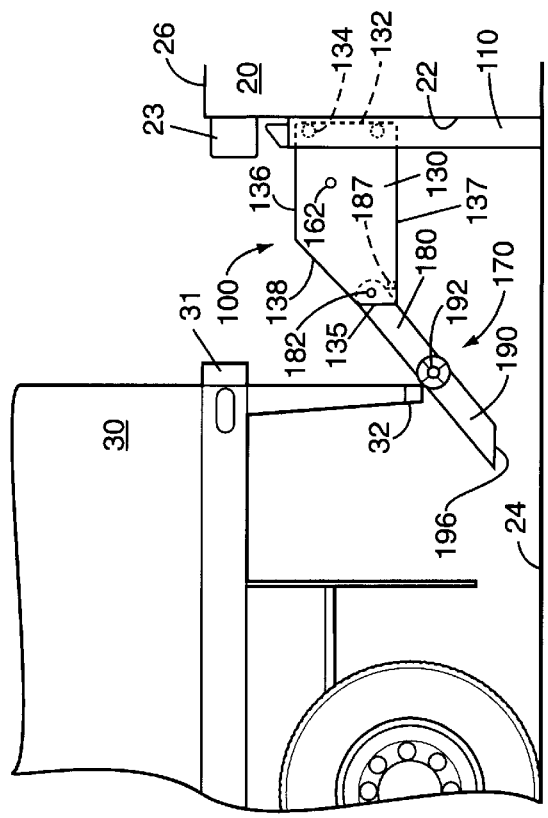
Figure 7:
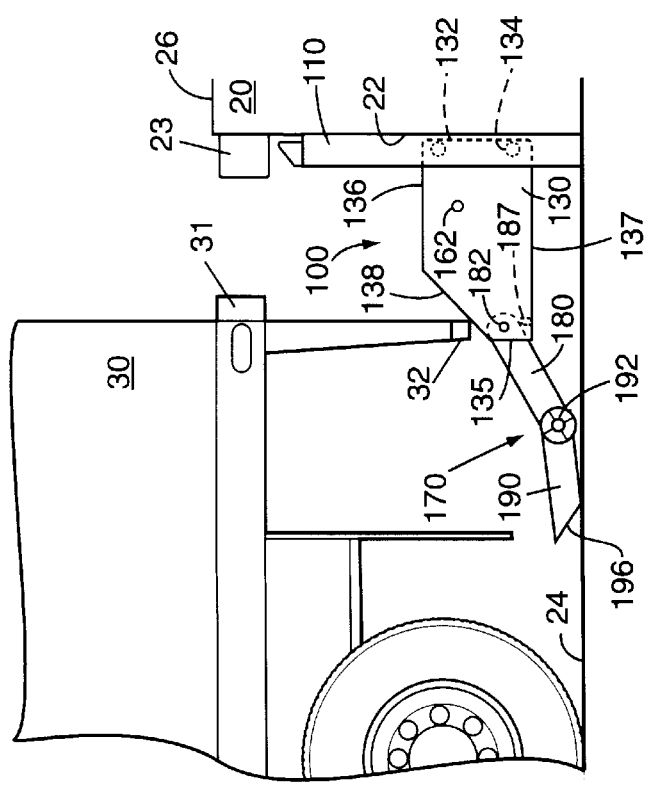

Referring to FIGS. 3–8, as a trailer 30 moves backwardly with respect to the front wall 22 of the loading dock 20 toward a parked position, the ICC bar 32 of the trailer 30 engages, in succession, the second and first members 180 and 190 of the inventive slope extension 170 and the exposed cam surfaces 138 and the upper surfaces 136 of the carriage assembly 130. Prior to engagement, the carriage assembly 130 assumes the upper operating position, as shown in FIG. 3, and the distal end 196 of the second member 190 is spaced-apart from the roadway 24. When the ICC bar 32 engages either the first or second member 180 or 190 of the slope extension 170, as shown in FIG. 4, an external force is exerted directly on the slope extension 170 (and indirectly on the carriage assembly 130) which counteracts the biasing provided by springs 142. As the trailer 30 continues to back toward the loading dock 20, this external force causes the carriage assembly 130 to move downwardly within the guide tracks 112 of the mounting structure 110 past the predetermined operating position, as shown in FIG. 5, and toward successively lower operating positions, as shown in FIGS. 6–8, while the distal end 196 of the second member 190 engages the roadway 24 and the first and second members 180 and 190 independently articulate or yield relative to each other and the carriage assembly 130 to permit continued downward descent of the carriage assembly 130. At the same time, the ICC bar 32 continues to move the carriage assembly 130 downwardly toward the roadway 24 and engages, in succession, the first member 180 of the slope extension 170, the exposed cam surfaces 138 of the carriage assembly 130, and the upper surfaces 136 of the carriage assembly 130. Once the trailer 30 arrives at the parked position, the restraining member 150 may be rotated outwardly toward the operative position, as shown in FIG. 8, to interlockingly engage the ICC bar 32.

Figure 2:
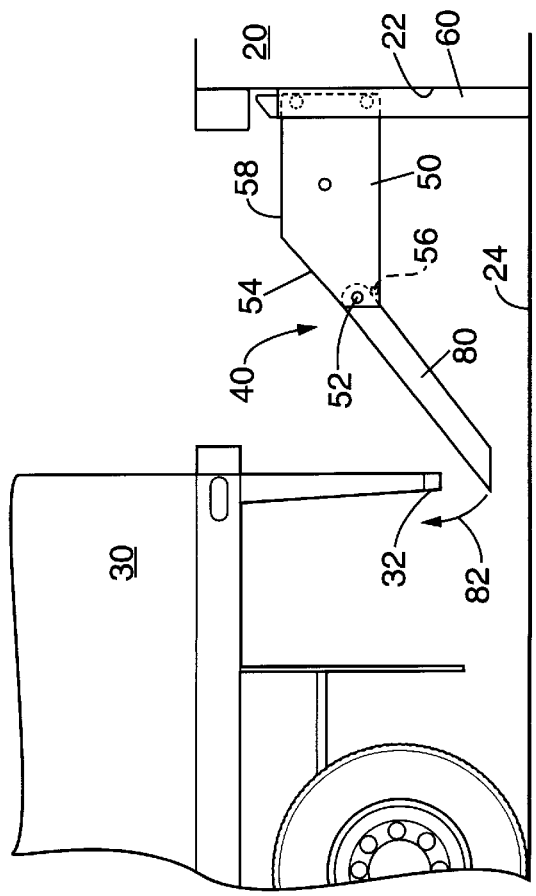
FIG. 2 is a side elevational view of the vehicle restraint depicted in FIG. 1, showing an ICC bar of a trailer engaging a slope extension of the vehicle restraint and the carriage assembly of the vehicle restraint in a "dead lock" condition.

In keeping with an important aspect of the present invention, the articulated slope extension 170 shown in FIGS. 3–9, unlike the prior art slope extension 80 shown in FIGS. 1 and 2, is not susceptible to a "dead lock" condition because the first and second members 180 and 190 independently pivot with respect to each other and the carriage assembly 130. For example, even though the distal end 196 of the second member 190 engages the roadway 24 while the ICC bar 32 is located below pivot point 182, as shown in FIG. 5, the inventive slope extension 170 is not subjected to a "dead lock" condition. Instead, the second member 190 advantageously articulates or yields relative to the first member 180 at pivot point 192, as shown in FIG. 6, which permits the ICC bar 32 to continue moving the carriage assembly 130 downwardly toward the roadway 24 as it engages the exposed cam surfaces 138 of the carriage assembly 130. Thus, in sharp contrast to the prior art slope extension 80 shown in FIGS. 1 and 2, the first embodiment of the inventive slope extension 170 is not susceptible to a "dead lock" condition and can accommodate trailers 30 with ICC bars 32 that are lower in elevation than pivot point 182 after the distal end 196 of the second member 190 contacts the roadway 24.

As shown in FIGS. 10–17, the second embodiment of the slope extension 270 comprises a structural member 280 having a first end 281 which is pivotably attached to the roadway 24, a second end 282 opposite the first end 281, and one or more lower cam surfaces 284 disposed between the first and second ends 281 and 282 which slidably engage protuberances 146, such as roller-type elements, formed on and extending outwardly from the side plates 131 of the carriage assembly 130. The structural member 280 also includes one or more top surfaces 283 disposed between the first and second ends 281 and 282 which are adapted to be engaged by the ICC bar 32 of a trailer 30 as the trailer 30 moves backwardly toward the front wall 22 of the loading dock 20.

As best shown in FIG. 16, the structural member 280 includes a pair of spaced-apart side portions 296 and 297 which are pivotably attached to the roadway 24 at the first end 281 and receive the forward end 135 of carriage assembly 130 at the second end 282. In this way, the side portions 296 and 297 of the structural member 280 are coupled at the first end 281 thereof, but are spaced-apart at the second end 282 thereof to accommodate the width of the carriage assembly 130. In addition, the exemplary structural member 280 is substantially straight, except that the cam surfaces 284 include inclined portions 285 which are disposed proximate to the second end 282 of the structural member 280. While a substantially straight structural member 280 is shown herein, it will be readily appreciated by those skilled in the art that the structural member 280 may alternatively have a curvilinear design or other configuration without departing from the scope or spirit of the present invention.

In the illustrated embodiment, the first end 281 of the structural member 280 is pivotably attached to the roadway 24 with an anchoring assembly 291. As shown in FIGS. 10–15, the anchoring assembly 291 includes a mounting bracket 292 which is fixedly secured to the roadway 24 in a conventional manner, and a peg-type member 294 which extends transversely through complementary-shaped holes (not shown) formed in both the first end 281 of the structural member 280 and the mounting bracket 292.

Figure 11:
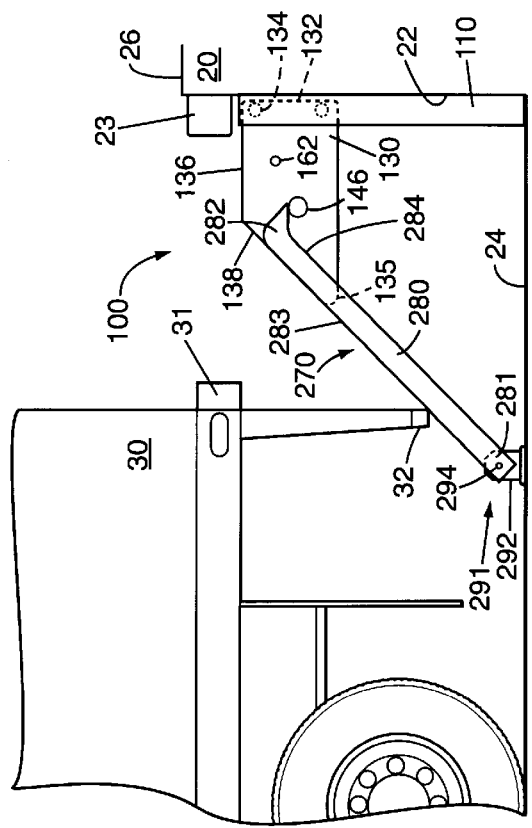
FIGS. 11–14 are side elevational views of the vehicle restraint depicted in FIG. 10, showing an ICC bar of a trailer sequentially engaging the slope extension as the trailer moves backwardly toward a loading dock.
Figure 10:
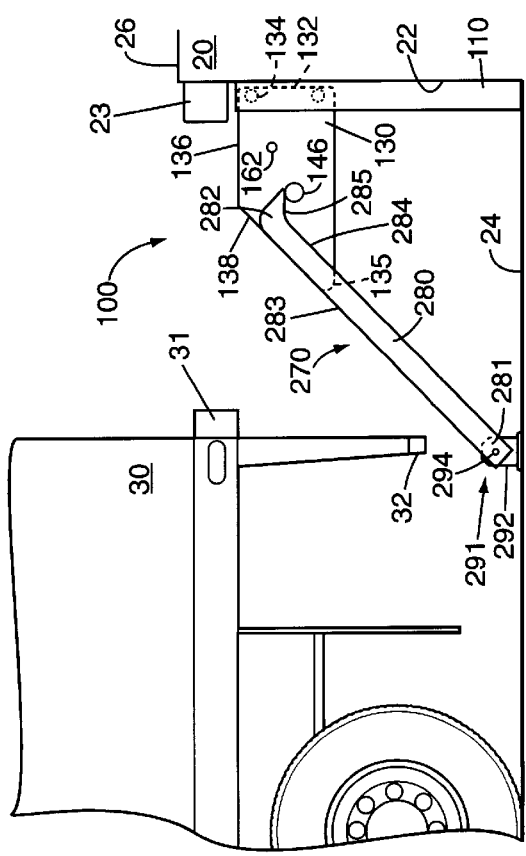
FIG. 10 is a side elevational view of a vehicle restraint having a carriage assembly and a slope extension constructed in accordance with a second embodiment of the present invention.
Figure 13:
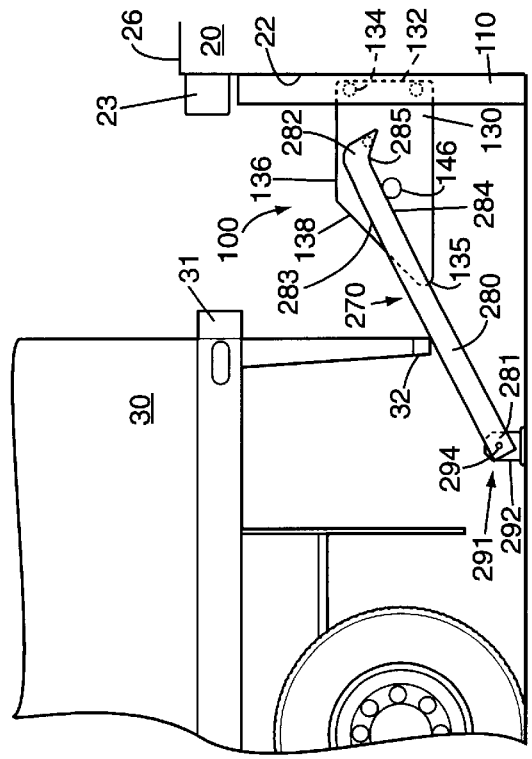
Figure 12:
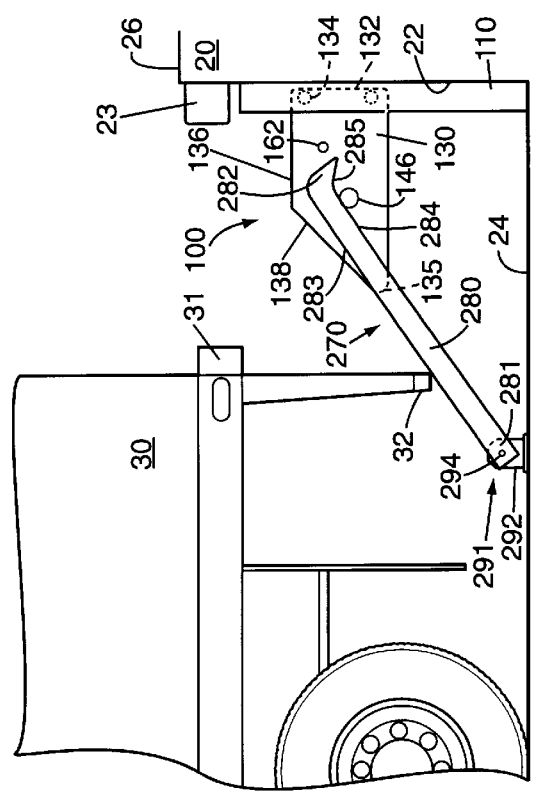
Figure 14:
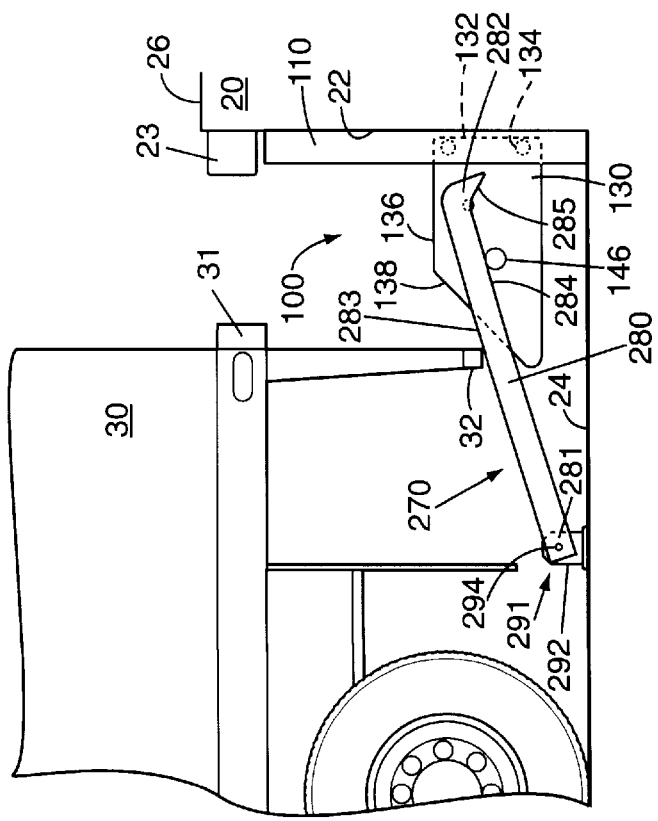

When the trailer 30 moves backwardly with respect to the front wall 22 of the loading dock 20 toward a parked position, the ICC bar 32 of the trailer 30 sequentially engages both the structural member 280 of the inventive slope extension 270 and the carriage assembly 130 of the vehicle restraint 100, as shown in FIGS. 10–15. Prior to engagement, the carriage assembly 130 is biased into an upper operating position, as shown in FIG. 10, with biasing elements (not shown), such as resilient springs, and the inclined portions 285 of the cam surfaces 284 engage the protuberances 146 of the carriage assembly 130. When the ICC bar 32 engages the structural member 280, as shown in FIG. 11, however, an external force is exerted directly on the structural member 280, and indirectly on the carriage assembly 130, which counteracts the biasing provided by the resilient biasing elements. As the trailer 30 continues to back toward the loading dock 20, this external force causes the carriage assembly 130 to move from the upper operating position toward successively lower operating positions, as shown in FIGS. 12–14. More specifically, the ICC bar 32 acts against and rides along the top surfaces 283 of the structural member 280 (in a direction toward the second end 282) which causes the second end 282 of the structural member 280 to rotate downwardly about pivot point 294 toward the roadway 24. At the same time, the cam surfaces 284 of the structural member 280 act against the protuberances 146 of the carriage assembly 130 which causes the carriage assembly 130 to move downwardly within the guide tracks 112 of the mounting structure 110 toward successively lower operating positions while the protuberances 146 of the carriage assembly 130 move along the cam surfaces 284 of the structural member 280 (in a direction toward the first end 281).

After losing contact with the top surfaces 283 of the structural member 280, the ICC bar 32 engages, in succession, the exposed cam surfaces 138 and the upper surfaces 136 of the carriage assembly 130, as depicted in FIG. 15. Of course, when the ICC bar 32 engages the carriage assembly 130, the external force is applied directly to the carriage assembly 130, rather than indirectly through the structural member 280. Once the trailer 30 arrives at the parked position, a restraining member, such as substantially hook-shaped member 150, may then be rotated outwardly toward the operative position, as shown, for example, in FIG. 15, to secure the trailer 30 to the loading dock 20 by interlockingly engaging the ICC bar 32 of the trailer 30.

In accordance with important aspect of the present invention, the second embodiment of the inventive slope extension 270 is not susceptible to a "dead lock" condition because the structural member 280 is not pivotably attached to the carriage assembly 130. Instead, the structural member 280 is pivotably attached to the roadway 24 and slidably engages the carriage assembly 130 which permits the carriage assembly 130 to move between its upper operating position and its lowest operating position in an uninterrupted manner. On account of this novel construction, the structural member 280 spans any gap which may exist between the carriage assembly 130 and the roadway 24 which not only prevents vehicles 30 from going underneath the carriage assembly 130, but enables the inventive slope extension 270 to accommodate a much wider range of vehicles 30 than the prior art slope extension 80 shown in FIGS. 1 and 2, including trailers 30 with low ICC bars 32.

When slope extension 270 is utilized in a motorized vehicle restraint such as depicted in FIG. 9, it is important to avoid interference between the side portion 296 of the structural member 280 and the motor 160 which actuates the restraining member 150. To this end, one of the two protuberances 146 extends outwardly beyond the ledge structure 139 supporting the motor 160, as shown, for example, in FIG. 16. In particular, this extended or longer protuberance 296 of the carriage assembly 130 engages side portion 296 of the structural member 280 at a point outboard of the ledge structure 139 for the motor 160. On account of this construction, a sufficient amount of clearance is provided between side portion 296 of the structural member 280 and the ledge structure 139 supporting the motor 160 to avoid interference therebetween at each operating position of the carriage assembly 130.

In an alternative construction of the carriage assembly 130, three substantially parallel side plates 131a, 131b, and 131c are provided for use with slope extension 270, as shown, for example, in FIG. 17. In this construction, the restraining member 150 is positioned between side plate 131a and side plate 131b, the ledge structure 139 which supports the motor 160 is positioned outboard of side plate 131c, and the shaft 162 which links the restraining member 150 to the motor 160 extends through each of the three side plate 131a, 131b, and 131c. In addition, first protuberance 146a extends outwardly from side plate 131a for engagement with side portion 297 of structural member 280, and second protuberance 146b extends between side plate 131b and side plate 131c for engagement with side portion 296 of structural member 280. On account of this three-side plate construction, side portion 296 of the structural member 280 is physically segregated from the ledge structure 139 supporting the motor 160 to avoid interference therebetween at each operating position of the carriage assembly 130.

While this three-side plate construction operates in a generally unobstructed manner, those skilled in the art will appreciate that minor modifications to slope extension 270 may be required to avoid interference between side portion 296 of the structural member 280 and the shaft 162 from the motor 160 at lower operating positions of the carriage assembly 130. For example, depending upon the operational range of the carriage assembly 130, it may be necessary to modify the shape or slope of one or both of the two side portions 296 and 297 and/or the placement of the two protuberances 146*a* and 146*b* from what is shown in FIGS. 10–16.

While the present invention has been described and disclosed in connection with certain preferred embodiments, it will be understood that there is no intention to limit the invention to the disclosed structural forms. On the contrary, the intention is to cover all modifications, alternative constructions, and equivalents that fall within the scope and spirit of the invention as defined by the following claims.

What is claimed is:

1. For use with a vehicle having a rear-impact guard, a vehicle restraint for releasably securing a vehicle to an adjacent structure, the vehicle restraint comprising:

at least one guide track adapted to be secured to the structure;

a carriage assembly slidably mounted to the at least one guide track for movement relative to a roadway;

a restraining member associated with the carriage assembly for engaging the rear-impact guard of the vehicle to releasably secure the vehicle to the adjacent structure;

at least one spring cooperating with the carriage assembly to bias the carriage assembly away from the roadway;

a first member pivotably attached to the carriage assembly for movement between a first pendant position and a first raised position, the first member and the carriage assembly cooperating such that the first member extends outwardly and downwardly from the carriage assembly to present a first camming surface to the vehicle when the first member is in the first pendant position; and a second member pivotably attached to the first member for movement between a second pendant position and a second raised position, the first member and the second member cooperating such that the second member extends outwardly and downwardly from the first member to present a second camming surface to the vehicle when the second member is in the second pendant position, the second member pivoting independently of the first member to permit continued downward descent of the carriage assembly as the carriage assembly is moved downwardly below a predetermined operating position relative to the roadway.

2. The invention set forth in claim 1, wherein the second member includes a distal end which is adapted to engage the roadway when the carriage assembly is moved into the predetermined operating position.

3. The invention set forth in claim 1, wherein the first member has a first cam surface which forms a substantially coplanar extension of a second cam surface of the carriage assembly when the first member is in the first pendant position, and the second member has a third cam surface which forms a substantially coplanar extension of the first cam surface of the first member when the second member is in the second pendant position and the first member is in the first pendant position.

4. The invention set forth in claim 1, wherein the carriage assembly includes a stop member which prevents the first member from rotating downwardly past the first pendant position.

5. The invention set forth in claim 1, wherein the second member includes a stop element which prevents the second member from rotating downwardly past the second pendant position.

6. The invention set forth in claim 1, wherein at least one of the first member and the second member includes a stop element which prevents the second member from rotating downwardly past the second pendant position.

7. The invention set forth in claim 1, wherein the first and second members are respectively adapted to rotate independently upward relative to each other and the carriage assembly from the first and second pendant positions when the carriage assembly is moved downwardly below the predetermined operating position.

8. The invention set forth in claim 1, wherein a distal end of the second member is positioned to contact the roadway when the carriage assembly enters the predetermined operating position and the second member is in the second pendant position, and the second member is adapted to rotate upward from the second pendant position relative to the first member and the first member is adapted to rotate upward from the first pendant position relative to the carriage assembly when the carriage assembly moves below the predetermined operating position.

9. The invention set forth in claim 1, wherein the restraining member is pivotably attached to the carriage assembly.

10. For use with a vehicle having a rear-impact guard and a vehicle restraint for cooperating with the rear-impact guard to releasably secure the vehicle to an adjacent structure, the vehicle restraint having a carriage assembly with a first camming surface which cooperates with the rear-impact guard of the backing vehicle to move the carriage assembly downward relative to a parking surface to position the vehicle restraint at a height to secure the rear-impact guard to the adjacent structure, a slope extension comprising:

a first member pivotably attached to the carriage assembly for movement between a first pendant position and a first raised position, the first member and the carriage assembly cooperating such that the first member extends outwardly and downwardly from the carriage assembly to present a second camming surface to the backing vehicle when the first member is in the first pendant position; and a second member pivotably attached to the first member for movement between a second pendant position and a second raised position, the first member and the second member cooperating such that the second member extends outwardly and downwardly from the first member to present a third camming surface to the backing vehicle when the second member is in the second pendant position, wherein the second member pivots out of the second pendant position to permit continued downward descent of the carriage assembly as the carriage assembly is moved downward relative to the parking surface by the backing vehicle.

11. A slope extension as defined in claim 10 wherein the first member pivots out of the first pendant position to permit continued downward descent of the carriage assembly as the carriage assembly is moved downward relative to the parking surface by the backing vehicle.

12. For use with a vehicle having a rear-impact guard and a vehicle restraint for cooperating with the rear-impact guard to releasably secure the vehicle to an adjacent structure, the vehicle restraint having a carriage assembly with a camming surface which cooperates with the rear-impact guard of the backing vehicle to move the carriage assembly downward relative to a parking surface to position the vehicle restraint at a height to secure the rear-impact guard to the adjacent structure, a slope extension comprising:

a first member pivotably attached to the carriage assembly for movement between a first pendant position and a first raised position, the first member and the carriage assembly cooperating such that the first member extends outwardly and downwardly from the carriage assembly when the first member is in the first pendant position; and a second member pivotably attached to the first member for movement between a second pendant position and a second raised position, the first member and the second member cooperating such that the second member extends outwardly and downwardly from the first member when the second member is in the second pendant position and the first member is in the first pendant position, both of the first and second members pivoting outwardly and upwardly relative to the carriage assembly to permit continued downward descent of the carriage assembly as the carriage assembly is moved downward relative to the parking surface by the backing vehicle.

13. For use with a vehicle having a rear-impact guard and a vehicle restraint for cooperating with the rear-impact guard to releasably secure the vehicle to an adjacent structure, the vehicle restraint having a carriage assembly with a camming surface which cooperates with the rear-impact guard of the backing vehicle to move the carriage assembly downward relative to a parking surface to position the vehicle restraint at a height to secure the rear-impact guard to the adjacent structure, a slope extension comprising:

a first member coupled to the carriage assembly for movement between a first pendant position and a first raised position, the first member and the carriage assembly cooperating such that the first member extends outwardly and downwardly from the carriage assembly when the first member is in the first pendant position; and a second member having a first end which is pivotably attached to the first member and a second free end for selectively contacting the parking surface, the second member being mounted for movement between a second pendant position and a second raised position, the second member pivoting out of the second pendant position after the carriage assembly moves past a predetermined operating position to permit continued downward descent of the carriage assembly as the carriage assembly is moved downward relative to the parking surface by the backing vehicle.

14. A slope extension as defined in claim 13 wherein the first member pivots out of the first pendant position to permit continued downward descent of the carriage assembly as the carriage assembly is moved downward relative to the parking surface by the backing vehicle.

15. A slope extension as defined in claim 13 wherein the second member pivots out of the second pendant position after the second free end contacts the parking surface.

* * * * *